US010721234B2

(12) United States Patent
Faitelson et al.

(10) Patent No.: US 10,721,234 B2
(45) Date of Patent: Jul. 21, 2020

(54) ACCESS PERMISSIONS MANAGEMENT SYSTEM AND METHOD

(75) Inventors: Yakov Faitelson, Elkana (IL); Ohad Korkus, Herzeliya (IL); Ophir Kretzer-Katzir, Reut (IL)

(73) Assignee: VARONIS SYSTEMS, INC., New York, NY (US)

( * ) Notice: Subject to any disclaimer, the term of this patent is extended or adjusted under 35 U.S.C. 154(b) by 0 days.

(21) Appl. No.: 13/378,115

(22) PCT Filed: Nov. 24, 2011

(86) PCT No.: PCT/IL2011/000903
§ 371 (c)(1),
(2), (4) Date: Feb. 29, 2012

(87) PCT Pub. No.: WO2012/101621
PCT Pub. Date: Aug. 2, 2012

(65) Prior Publication Data
US 2012/0272294 A1 Oct. 25, 2012

Related U.S. Application Data

(60) Provisional application No. 61/477,662, filed on Apr. 21, 2011.

(51) Int. Cl.
| | |
|---|---|
| *H04L 29/06* | (2006.01) |
| *G06F 21/62* | (2013.01) |
| *G06F 21/41* | (2013.01) |
| *G06F 21/45* | (2013.01) |
| *G06F 21/60* | (2013.01) |

(52) U.S. Cl.
CPC ............ *H04L 63/101* (2013.01); *G06F 21/41* (2013.01); *G06F 21/45* (2013.01); *G06F 21/604* (2013.01); *G06F 21/62* (2013.01); *G06F 21/6218* (2013.01)

(58) Field of Classification Search
CPC .................................. H04L 63/10; G06F 21/62
USPC ........................................................ 726/4, 27
See application file for complete search history.

(56) References Cited

U.S. PATENT DOCUMENTS

| | | | |
|---|---|---|---|
| 5,465,387 | A | 11/1995 | Mukherjee |
| 5,761,669 | A | 6/1998 | Montague et al. |
| 5,889,952 | A | 3/1999 | Hunnicutt et al. |
| 5,899,991 | A | 5/1999 | Karch |

(Continued)

FOREIGN PATENT DOCUMENTS

| | | | | |
|---|---|---|---|---|
| CN | 1588889 A | | 3/2005 | |
| JP | 2005267237 A | * | 9/2005 | ............. G06F 12/14 |

(Continued)

OTHER PUBLICATIONS

U.S. Appl. No. 60/688,486, filed Jun. 7, 2005, Specification and Claims.

(Continued)

*Primary Examiner* — Jason Chiang

(57) ABSTRACT

A system for providing bi-directional visualization of authority of users over SACs in an enterprise-wide network, the system including functionality for providing user-wise visualization of the authority of a given user over at least one SAC in respect of which the user has authority, and functionality for providing SAC-wise visualization for a given SAC of the authority of at least one user over the given SAC.

10 Claims, 13 Drawing Sheets

(56) References Cited

U.S. PATENT DOCUMENTS

| | | | |
|---|---|---|---|
| 6,023,765 A | 2/2000 | Kuhn | |
| 6,178,505 B1 | 1/2001 | Schneider et al. | |
| 6,308,173 B1 | 10/2001 | Glasser et al. | |
| 6,338,082 B1 | 1/2002 | Schneider | |
| 6,393,468 B1 | 5/2002 | McGee | |
| 6,772,350 B1 | 8/2004 | Belani et al. | |
| 6,928,439 B2 | 8/2005 | Satoh | |
| 6,993,137 B2 | 1/2006 | Fransdonk | |
| 6,996,577 B1 | 2/2006 | Kiran et al. | |
| 7,007,032 B1 | 2/2006 | Chen et al. | |
| 7,017,183 B1 | 3/2006 | Frey et al. | |
| 7,031,984 B2 | 4/2006 | Kawamura et al. | |
| 7,068,592 B1 | 6/2006 | Duvaut et al. | |
| 7,124,272 B1 | 10/2006 | Kennedy et al. | |
| 7,185,192 B1 | 2/2007 | Kahn | |
| 7,219,234 B1 | 5/2007 | Ashland et al. | |
| 7,305,562 B1* | 12/2007 | Bianco et al. | 713/186 |
| 7,403,925 B2 | 7/2008 | Schlesinger et al. | |
| 7,421,740 B2 | 9/2008 | Fey et al. | |
| 7,529,748 B2 | 5/2009 | Wen et al. | |
| 7,555,482 B2 | 6/2009 | Korkus | |
| 7,580,934 B2 | 8/2009 | Futatsugi | |
| 7,606,801 B2 | 10/2009 | Faitelson et al. | |
| 7,716,240 B2 | 5/2010 | Lim | |
| 7,743,420 B2 | 6/2010 | Shulman et al. | |
| 7,849,496 B2 | 12/2010 | Ahern et al. | |
| 7,983,264 B2* | 7/2011 | Etheridge | 370/392 |
| 8,239,925 B2 | 8/2012 | Faitelson et al. | |
| 8,327,419 B1 | 12/2012 | Korablev et al. | |
| 8,447,829 B1 | 5/2013 | Geller | |
| 2002/0002557 A1 | 1/2002 | Straube et al. | |
| 2002/0026592 A1 | 2/2002 | Gavrila et al. | |
| 2002/0174307 A1 | 11/2002 | Yoshida et al. | |
| 2003/0048301 A1 | 3/2003 | Menninger | |
| 2003/0051026 A1 | 3/2003 | Carter et al. | |
| 2003/0074580 A1 | 4/2003 | Knouse et al. | |
| 2003/0188198 A1 | 10/2003 | Holdsworth et al. | |
| 2003/0231207 A1 | 12/2003 | Huang | |
| 2004/0030915 A1 | 2/2004 | Sameshima et al. | |
| 2004/0186809 A1 | 9/2004 | Schlesinger et al. | |
| 2004/0205342 A1 | 10/2004 | Roegner | |
| 2004/0249847 A1 | 12/2004 | Wang et al. | |
| 2004/0254919 A1 | 12/2004 | Giuseppini | |
| 2004/0260952 A1 | 12/2004 | Newman et al. | |
| 2005/0007619 A1* | 1/2005 | Minato | 358/1.14 |
| 2005/0044396 A1* | 2/2005 | Vogel et al. | 713/200 |
| 2005/0044399 A1 | 2/2005 | Dorey | |
| 2005/0065823 A1 | 3/2005 | Ramraj et al. | |
| 2005/0086529 A1 | 4/2005 | Buchsbaum | |
| 2005/0108206 A1 | 5/2005 | Lam et al. | |
| 2005/0120054 A1 | 6/2005 | Shulman et al. | |
| 2005/0187937 A1 | 8/2005 | Kawabe et al. | |
| 2005/0203881 A1 | 9/2005 | Sakamoto et al. | |
| 2005/0246762 A1 | 11/2005 | Girouard et al. | |
| 2005/0278334 A1 | 12/2005 | Fey et al. | |
| 2005/0278785 A1 | 12/2005 | Lieberman | |
| 2006/0037062 A1 | 2/2006 | Araujo | |
| 2006/0064313 A1 | 3/2006 | Steinbarth et al. | |
| 2006/0090208 A1 | 4/2006 | Smith | |
| 2006/0184459 A1 | 8/2006 | Parida | |
| 2006/0184530 A1* | 8/2006 | Song et al. | 707/9 |
| 2006/0271523 A1 | 11/2006 | Brookler | |
| 2006/0277184 A1 | 12/2006 | Faitelson et al. | |
| 2006/0294578 A1 | 12/2006 | Burke et al. | |
| 2007/0033340 A1 | 2/2007 | Tulskie et al. | |
| 2007/0061487 A1 | 3/2007 | Moore et al. | |
| 2007/0073698 A1 | 3/2007 | Kanayama et al. | |
| 2007/0094265 A1 | 4/2007 | Korkus | |
| 2007/0101387 A1 | 5/2007 | Hua et al. | |
| 2007/0112743 A1 | 5/2007 | Giampaolo et al. | |
| 2007/0121501 A1 | 5/2007 | Bryson | |
| 2007/0136603 A1 | 6/2007 | Kuecuekyan | |
| 2007/0156659 A1 | 7/2007 | Lim | |
| 2007/0156693 A1 | 7/2007 | Soin et al. | |
| 2007/0198608 A1 | 8/2007 | Prahlad et al. | |
| 2007/0203872 A1 | 8/2007 | Flinn et al. | |
| 2007/0214497 A1 | 9/2007 | Montgomery et al. | |
| 2007/0244899 A1* | 10/2007 | Faitelson et al. | 707/9 |
| 2007/0261121 A1 | 11/2007 | Jacobson | |
| 2007/0266006 A1 | 11/2007 | Buss | |
| 2007/0276823 A1 | 11/2007 | Borden et al. | |
| 2007/0282855 A1 | 12/2007 | Chen et al. | |
| 2008/0031447 A1 | 2/2008 | Geshwind et al. | |
| 2008/0034205 A1 | 2/2008 | Alain et al. | |
| 2008/0034402 A1 | 2/2008 | Botz et al. | |
| 2008/0091682 A1 | 4/2008 | Lim | |
| 2008/0097998 A1 | 4/2008 | Herbach | |
| 2008/0162707 A1 | 7/2008 | Beck et al. | |
| 2008/0172720 A1 | 7/2008 | Botz et al. | |
| 2008/0184330 A1 | 7/2008 | Lal et al. | |
| 2008/0270462 A1 | 10/2008 | Thomsen | |
| 2008/0271157 A1 | 10/2008 | Faitelson et al. | |
| 2009/0031418 A1 | 1/2009 | Matsuda et al. | |
| 2009/0100058 A1* | 4/2009 | Faitelson et al. | 707/9 |
| 2009/0119298 A1* | 5/2009 | Faitelson et al. | 707/9 |
| 2009/0150981 A1 | 6/2009 | Amies et al. | |
| 2009/0182715 A1 | 7/2009 | Falkenberg | |
| 2009/0198892 A1 | 8/2009 | Alvarez et al. | |
| 2009/0249446 A1 | 10/2009 | Jenkins et al. | |
| 2009/0265780 A1 | 10/2009 | Korkus et al. | |
| 2009/0320088 A1 | 12/2009 | Gill et al. | |
| 2010/0011438 A1 | 1/2010 | Bartley et al. | |
| 2010/0037324 A1 | 2/2010 | Grant et al. | |
| 2010/0058434 A1* | 3/2010 | Chusing et al. | 726/1 |
| 2010/0070881 A1 | 3/2010 | Hanson et al. | |
| 2010/0076972 A1 | 3/2010 | Baron et al. | |
| 2010/0262625 A1* | 10/2010 | Pittenger | 707/783 |
| 2011/0010758 A1 | 1/2011 | Faitelson et al. | |
| 2011/0060916 A1 | 3/2011 | Faitelson et al. | |
| 2011/0061093 A1 | 3/2011 | Korkus et al. | |
| 2011/0061111 A1 | 3/2011 | Faitelson et al. | |
| 2011/0126111 A1* | 5/2011 | Gill et al. | 715/736 |
| 2011/0184989 A1 | 7/2011 | Faitelson et al. | |
| 2011/0296490 A1 | 12/2011 | Faitelson et al. | |
| 2012/0011161 A1 | 1/2012 | Marathe | |
| 2012/0054283 A1 | 3/2012 | Korkus et al. | |
| 2012/0078965 A1 | 3/2012 | Laitkorpi | |
| 2012/0221550 A1 | 8/2012 | Korkus et al. | |
| 2012/0271853 A1* | 10/2012 | Faitelson et al. | 707/783 |
| 2012/0271855 A1* | 10/2012 | Faitelson et al. | 707/785 |
| 2012/0291100 A1 | 11/2012 | Faitelson et al. | |

FOREIGN PATENT DOCUMENTS

| | | |
|---|---|---|
| JP | 2010287171 A * | 12/2010 |
| WO | 2011/030324 A1 | 3/2011 |
| WO | 2011/148376 A2 | 12/2011 |
| WO | 2011/148377 A1 | 12/2011 |

OTHER PUBLICATIONS

Sahadeb De, et al; "Secure Access Control in a Multi-user Geodatabase", available on the Internet at the URL http://www10.giscafe.com. 2005.

Sara C. Madeira, et al; "Biclustering Algorithms for Biological Data Analysis: A Survey", IEEE Transactions on Computational Biology and Bioinformatics, vol. 1, No. 1, Jan.-Mar. 2004, 22 pages; http://www.cs.princeton.edu/cources/archive/spr05/cos598E/bib/bicluster.pdf.

Sara C. Madeira; Clustering, Fuzzy Clustering and Biclustering: An Overview; Jun. 27, 2003, pp. 31-53.

Genunix; "Writing Filesystems—VFS and Vnode Interfaces", 5 pages, Oct. 2007.

S.R. Kleiman; "Vnodes: An Architecture for Multiple File System Types in Sun UNIX", USENIX Association: Summer Conference Proceedings, Atlanta 1986, 10 pages.

Findutils; GNU Project-Free Software Foundation (FSF), 3 pages, Nov. 2006.

DatAdvantage User Guide by Varonis, Version 1.0, Aug. 30, 2005, 71 pages.

DatAdvantage User Guide by Varonis, Version 2.0, Aug. 24, 2006, 118 pages.

(56) References Cited

OTHER PUBLICATIONS

DatAdvantage User Guide by Varonis, Version 2.5, Nov. 27, 2006, 124 pages.
DatAdvantage User Guide by Varonis, Version 2.6, Dec. 15, 2006, 127 pages.
DatAdvantage User Guide by Varonis, Version 2.7, Feb. 6, 2007, 131 pages.
DatAdvantage User Guide by Varonis, Version 3.0, Jun. 20, 2007, 153 pages.
A List of database tables in DatAdvantage 2.7, Feb. 6, 2007, 1 page.
A List of database tables in DatAdvantage 3.0, Jun. 20, 2007, 1 page.
White Paper; "Entitlement Reviews: A Practitioner's Guide", Varonis 2007, 16 pages.
Alex Woodie; Varonis Prevents Unauthorized Access to Unstructured Data:, Published Jul. 31, 2007, 6 pages.
Varonis; "Accelerating Audits with Automation: Understanding Who's Accessing Your Unstructured Data", Oct. 8, 2007; 7 pages.
Varonis; "The Business Case for Data Governance", Mar. 27, 2007; 8 pages.
USPTO NFOA dated Feb. 12, 2008 in connection with U.S. Appl. No. 11/258,256.
USPTO FOA dated Aug. 1, 2008 in connection with U.S. Appl. No. 11/258,256.
USPTO NFOA dated Oct. 31, 2008 in connection with U.S. Appl. No. 11/635,736.
USPTO NFOA dated Dec. 14, 2010 in connection with U.S. Appl. No. 11/786,522.
USPTO FOA dated Apr. 18, 2011 in connection with U.S. Appl. No. 11/786,522.
USPTO FOA dated Sep. 20, 2011 in connection with U.S. Appl. No. 11/786,522.
USPTO NFOA dated Mar. 13, 2012 in connection with U.S. Appl. No. 11/786,522.
USPTO NFOA dated Jul. 9, 2010 in connection with U.S. Appl. No. 11/789,884.
USPTO FOA dated Dec. 14, 2010 in connection with U.S. Appl. No. 11/789,884.
USPTO NOA dated Apr. 12, 2012 in connection with U.S. Appl. No. 11/789,884.
USPTO NFOA dated Sep. 16, 2010 in connection with U.S. Appl. No. 11/871,028.
USPTO FOA dated Apr. 28, 2011 in connection with U.S. Appl. No. 11/871,028.
USPTO NFOA dated Apr. 25, 2012 in connection with U.S. Appl. No. 12/498,675.
USPTO NFOA dated Aug. 28, 2012 in connection with U.S. Appl. No. 12/673,691.
USPTO NFOA dated Jul. 5, 2012 in connection with U.S. Appl. No. 12/772,450.
USPTO NFOA dated Jun. 22, 2012 in connection with U.S. Appl. No. 12/814,807.
USPTO NFOA dated Sep. 14, 2012 in connection with U.S. Appl. No. 12/861,967.
USPTO NFOA dated Jul. 11, 2012 in connection with U.S. Appl. No. 13/014,762.
USPTO RR dated Nov. 21, 2012 in connection with U.S. Appl. No. 13/106,023.
USPTO NFOA dated Sep. 19, 2012 in connection with U.S. Appl. No. 13/303,826.
ISR and Written Opinion dated Nov. 15, 2011 issued during prosecution of PCT/IL11/00408.
ISR and Written Opinion dated May 20, 2010 issued during prosecution of PCT/IL10/00069.
IPRP dated Mar. 13, 2012 issued during prosecution of PCT/IL2010/000069.
ISR and Written Opinion dated May 9, 2011 issued during prosecution of PCT/IL10/01090.
ISR dated May 23, 2011; PCT/IL11/00065.
IPRP dated Jul. 31, 2012 issued during prosecution of PCT/IL2011/000065.
ISR and Written Opinion dated Jun. 14, 2011 issued during prosecution of PCT/IL11/00066.
ISR and Written Opinion dated Jun. 13, 2011 issued during prosecution of PCT/IL11/00076.
ISR and Written Opinion dated May 24, 2011 issued during prosecution of PCT/IL11/00077.
ISR and Written Opinion dated May 25, 2011 issued during prosecution of PCT/IL11/00078.
IPRP dated Jul. 31, 2012 issued during prosecution of PCT/IL2011/000078.
ISR and Writted Opinion dated Apr. 13, 2012 issued during prosecution of PCT/IL11/00902.
ISR and Written Opinion dated Apr. 13, 2012 issued during prosecution of PCT/IL11/00903.
ISR and Written Opinion dated Aug. 31, 2012 issued during prosecution of PCT/IL2012/000163.
ISR and Written Opinion dated Oct. 1, 2012 issued during prosecution of PCT/IL2012/000240.
An Office Action dated Mar. 25, 2013, which issued during the prosecution of U.S. Appl. No. 13/303,826.
An Office Action dated Mar. 13, 2014, which issued during the prosecution of U.S. Appl. No. 13/159,903.
An Office Action dated Jun. 4, 2014 which issued during the prosecution of U.S. Appl. No. 13/303,826.
An English translation of an Office Action dated Aug. 5, 2015 which issued during the prosecution of Chinese Patent Application No. 201180065969.1.
An Office Action dated Apr. 19, 2017, which issued during the prosecution of U.S. Appl. No. 15/381,239.
European Search Report dated May 3, 2016, which issued during the prosecution of Applicant's European App No. 12774249.2.
Dennis Lu et al: "Jesse Dyer" (Jul. 15, 2004).
Ebell: "Access Control Lists-alfrescowiki" (Jun. 5, 2008).
USPTO FOA dated Oct. 30, 2014 in connection with U.S. Appl. No. 13/159,903.

\* cited by examiner

FIG. 4C

ACCESS PERMISSIONS MANAGEMENT SYSTEM AND METHOD

REFERENCE TO RELATED APPLICATIONS

Reference is made to U.S. patent application Ser. No. 13/014,762, filed Jan. 27, 2011, and entitled "AUTOMATIC RESOURCE OWNERSHIP ASSIGNMENT SYSTEMS AND METHODS", the disclosure of which is hereby incorporated by reference and priority of which is hereby claimed pursuant to 37 CFR 1.78(a) (1) and (2)(i).

Reference is also made to U.S. Provisional Patent Application Ser. No. 61/477,662, filed Apr. 21, 2011 and entitled "ACCESS PERMISSIONS MANAGEMENT SYSTEM AND METHOD", the disclosure of which is hereby incorporated by reference and priority of which is hereby claimed pursuant to 37 CFR 1.78(a) (4) and (5)(i).

Reference is also made to U.S. patent application Ser. No. 13/106,023, filed May 12, 2011, and entitled "AUTOMATIC RESOURCE OWNERSHIP ASSIGNMENT SYSTEM AND METHOD", the disclosure of which is hereby incorporated by reference and priority of which is hereby claimed pursuant to 37 CFR 1.78(a) (1) and (2)(i).

Reference is also made to U.S. patent application Ser. No. 13/159,903, filed Jun. 14, 2011, and entitled "ACCESS PERMISSIONS MANAGEMENT SYSTEM AND METHOD", the disclosure of which is hereby incorporated by reference and priority of which is hereby claimed pursuant to 37 CFR 1.78(a) (1) and (2)(i).

Reference is also made to U.S. patent application Ser. No. 13/303,826, filed Nov. 23, 2011, and entitled "ACCESS PERMISSIONS MANAGEMENT SYSTEM AND METHOD", the disclosure of which is hereby incorporated by reference and priority of which is hereby claimed pursuant to 37 CFR 1.78(a) (1) and (2)(i).

Reference is also made to the following patents and patent applications, owned by assignee, the disclosures of which are hereby incorporated by reference:

U.S. Pat. Nos. 7,555,482 and 7,606,801;

U.S. Published patent application Nos.: 2007/0244899, 2008/0271157, 2009/0100058, 2009/0119298, 2009/0265780; 2011/0010758; 2011/0060916; 2011/0061093; 2011/0061111 and 2011/0184989;

U.S. patent application Ser. Nos.: 12/861,059; 12/861,953 and 13/106,023; 13/159,903; and 13/303,826.

PCT Applications PCT/IL2011/000409 and PCT/IL2011/000408.

FIELD OF THE INVENTION

The present invention relates to data management generally and more particularly access permissions management.

BACKGROUND OF THE INVENTION

The following patent publications are believed to represent the current state of the art:

U.S. Pat. Nos.: 5,465,387; 5,899,991; 6,338,082; 6,393,468; 6,928,439; 7,031,984; 7,068,592; 7,403,925; 7,421,740; 7,555,482, 7,606,801 and 7,743,420; and U.S. Published patent application Nos.: 2003/0051026; 2004/0249847; 2005/0108206; 2005/0203881; 2005/0086529; 2006/0064313; 2006/0184530; 2006/0184459; 2007/0203872; 2007/0244899; 2008/0271157; 2009/0100058; 2009/0119298 and 2009/0265780.

SUMMARY OF THE INVENTION

The present invention provides improved systems and methodologies for access permissions management.

There is thus provided in accordance with a preferred embodiment of the present invention a system for providing bi-directional visualization of authority of users over SACs in an enterprise-wide network, the system including functionality for providing user-wise visualization of the authority of a given user over at least one SAC in respect of which the user has authority, and functionality for providing SAC-wise visualization for a given SAC of the authority of at least one user over the given SAC.

The term "SAC" for the purposes of this application is defined as a container which includes network objects such as computers, user groups and printers, but which may exclude data elements such as files and file folders. The authority of a user over a SAC for the purposes of this application is defined as the ability of a user to modify properties of network objects in the SAC.

The term "network object" for the purposes of this application is defined to include enterprise computer network resources. Examples of network objects include structured and unstructured computer data resources such as files and folders, disparate users and user groups.

Preferably, the SACs do not include data elements and the functionality for providing user-wise visualization does not provide visualization of authority of a given user over data elements. Alternatively, the SACs do not include data elements and the functionality for providing user-wise visualization also provides visualization of authority of a given user over data elements. Alternatively, the SACs include data elements and the functionality for providing user-wise visualization does not provide visualization of authority of a given user over the data elements. Alternatively, the SACs include data elements and the functionality for providing user-wise visualization also provides visualization of authority of a given user over the data elements.

Preferably, the system also includes functionality for providing user-wise monitoring and reporting of the exercise of authority by a given user over at least one SAC with respect to which the user has authority, and functionality for providing SAC-wise monitoring and reporting of the exercise of authority over a given SAC by at least one user having authority over the given SAC.

There is also provided in accordance with another preferred embodiment of the present invention a system for providing monitoring and bi-directional reporting of the exercise of authority by users and SACs in an enterprise-wide network, the system including functionality for providing user-wise monitoring and reporting of the exercise of authority by a given user over at least one SAC with respect to which the user has authority, and functionality for providing SAC-wise monitoring and reporting of the exercise of authority over a given SAC by at least one user having authority over the given SAC.

Preferably, the system also includes functionality for providing user-wise visualization of the authority of a given user over at least one SAC in respect of which the user has authority, and functionality for providing SAC-wise visualization for a given SAC of the authority of at least one user over the given SAC.

Preferably, the SACs do not include data elements and the functionality for providing user-wise visualization does not provide visualization of authority of a given user over data elements. Alternatively, the SACs do not include data elements and the functionality for providing user-wise visualization also provides visualization of authority of a given user over data elements. Alternatively, the SACs include data elements and the functionality for providing user-wise visualization does not provide visualization of authority of a given user over the data elements. Alternatively, the SACs include data elements and the functionality for providing user-wise visualization also provides visualization of authority of a given user over the data elements.

There is further provided in accordance with yet another preferred embodiment of the present invention a method for providing bi-directional visualization of authority of users over SACs in an enterprise-wide network, the method including providing user-wise visualization of the authority of a given user over at least one SAC in respect of which the user has authority, and providing SAC-wise visualization for a given SAC of the authority of at least one user over the given SAC.

Preferably, the SACs do not include data elements and providing user-wise visualization does not include providing visualization of authority of a given user over data elements. Alternatively, the SACs do not include data elements and providing user-wise visualization also includes providing visualization of authority of a given user over data elements. Alternatively, the SACs include data elements and providing user-wise visualization does not include providing visualization of authority of a given user over the data elements. Alternatively, the SACs include data elements and providing user-wise visualization also includes providing visualization of authority of a given user over the data elements.

Preferably, the method also includes providing user-wise monitoring and reporting of the exercise of authority by a given user over at least one SAC with respect to which the user has authority, and providing SAC-wise monitoring and reporting of the exercise of authority over a given SAC by at least one user having authority over the given SAC.

There is yet further provided in accordance with still another preferred embodiment of the present invention a method for providing monitoring and bi-directional reporting of the exercise of authority by users and SACs in an enterprise-wide network, the method including providing user-wise monitoring and reporting of the exercise of authority by a given user over at least one SAC with respect to which the user has authority, and providing SAC-wise monitoring and reporting of the exercise of authority over a given SAC by at least one user having authority over the given SAC.

Preferably, the the method also includes providing user-wise visualization of the authority of a given user over at least one SAC in respect of which the user has authority, and providing SAC-wise visualization for a given SAC of the authority of at least one user over the given SAC.

Preferably, the SACs do not include data elements and providing user-wise visualization does not include providing visualization of authority of a given user over data elements. Alternatively, the SACs do not include data elements and providing user-wise visualization also includes providing visualization of authority of a given user over data elements. Alternatively, the SACs include data elements and providing user-wise visualization does not include providing visualization of authority of a given user over the data elements. Alternatively, the SACs include data elements and providing user-wise visualization also includes providing visualization of authority of a given user over the data elements.

BRIEF DESCRIPTION OF THE DRAWINGS

The present invention will be understood and appreciated more fully from the following detailed description, taken in conjunction with the drawings in which:

FIGS. 4A, 4B and 4C are simplified pictorial illustrations of the use of a system for providing bi-directional visualization of authority of users over SACs in an enterprise-wide network, constructed and operative in accordance with a further preferred embodiment of the present invention.

DETAILED DESCRIPTION OF PREFERRED EMBODIMENTS

Figure 1A:
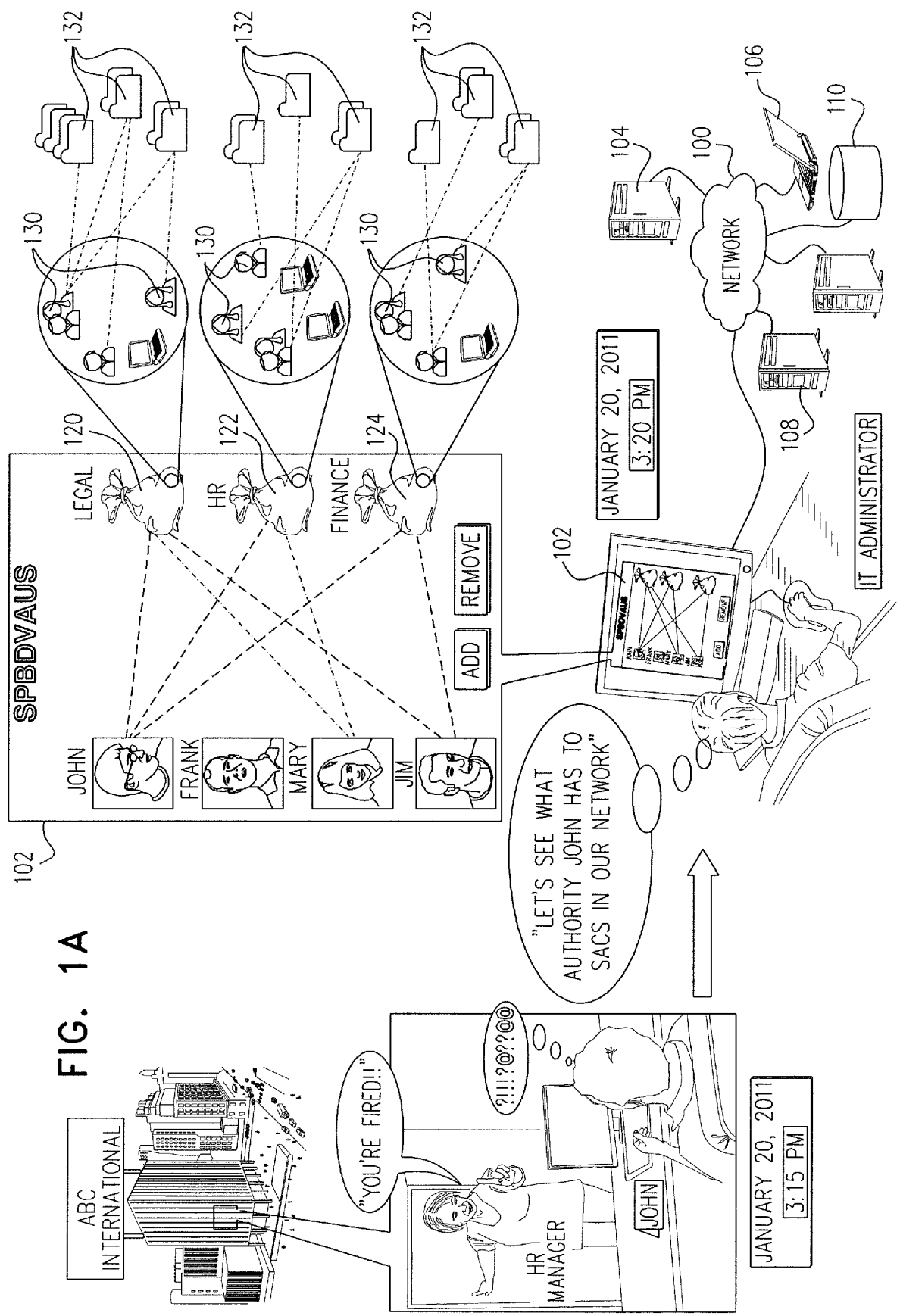
FIGS. 1A, 1B and 1C are simplified pictorial illustrations of the use of a system for providing bi-directional visualization of authority of users over SACs in an enterprise-wide network, constructed and operative in accordance with a preferred embodiment of the present invention.
Figure 1B:
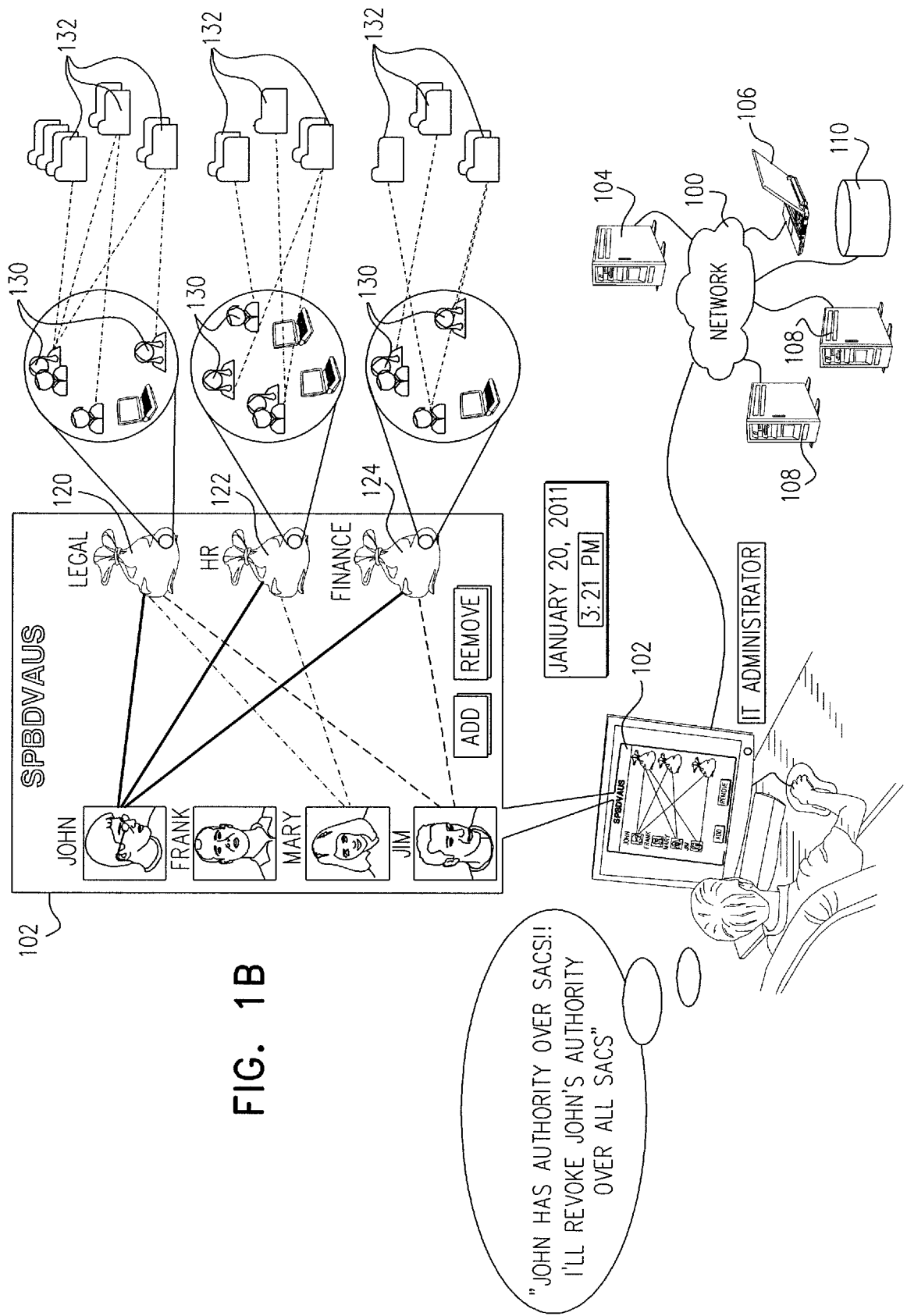
Figure 1C:
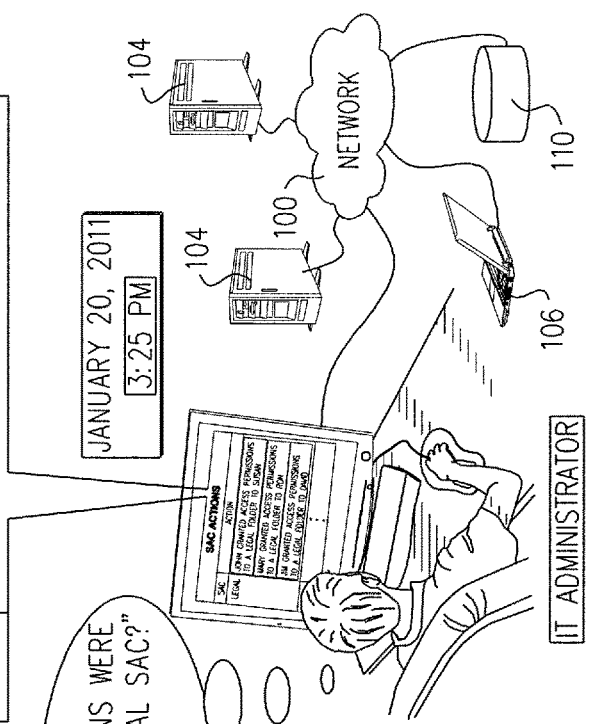
Figure 1C:
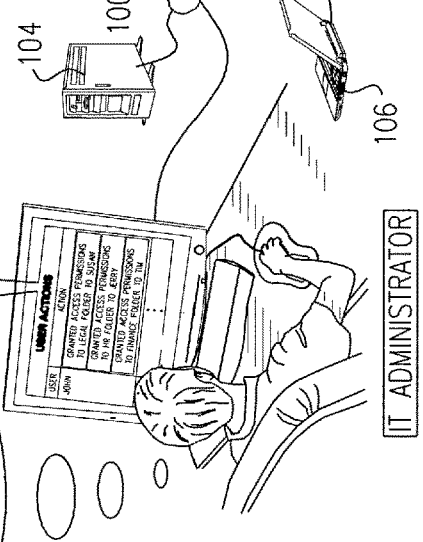

Reference is now made to FIGS. 1A, 1B and 1C, which are simplified pictorial illustrations of the use of a system for providing bi-directional visualization of authority of users over SACs in an enterprise-wide network, constructed and operative in accordance with a preferred embodiment of the present invention.

The term "SAC" for the purposes of this application is defined as a container which includes network objects such as computers, user groups and printers, but which may exclude data elements such as files and file folders. The authority of a user over a SAC for the purposes of this application is defined as the ability of a user to modify properties of network objects in the SAC.

The term "network object" for the purposes of this application is defined to include enterprise computer network resources. Examples of network objects include structured and unstructured computer data resources such as files and folders, disparate users and user groups.

The system for providing bi-directional visualization of authority of users over SACs (SPBDVAUS) of FIGS. 1A-1C is preferably suitable for operating in an enterprise computer environment which includes an enterprise level directory services management system which enables management of a plurality of SACs, and preferably includes functionality for providing user-wise visualization of the authority of a given user over at least one SAC in respect of which the user has authority and functionality for providing SAC-wise visualization for a given SAC of the authority of at least one user over the given SAC.

The SPBDVAUS also preferably includes functionality for providing user-wise monitoring and reporting of the exercise of authority by a given user over at least one SAC with respect to which the user has authority and functionality for providing SAC-wise monitoring and reporting of the exercise of authority over a given SAC by at least one user having authority over said given SAC.

As shown in FIG. 1A, at a particular time, such as on Jan. 20, 2011 at 3:15 PM, an HR manager of a company notifies John, an employee of the company, that his employment with the company is terminated. Shortly thereafter, such as at 3:20 PM, the IT manager of the enterprise network 100 of the company accesses a SPBDVAUS user interface 102 to obtain a user-wise visualization of the authority that users of network 100 have over SACs in network 100. The SPBDVAUS preferably resides on a server 104 which is preferably connected to network 100. Network 100 preferably also includes a plurality of disparate computers 106, servers 108 and storage devices 110.

As further shown in FIG. 1A, SPBDVAUS user interface 102 provides, for each of the users of network 100, user-wise visualization of the authority of a given user has over any of legal SAC 120, HR SAC 122 and finance SAC 124 of network 100. SPBDVAUS user interface 102 also provides, for each of SACs 120, 122 and 124, SAC-wise visualization for a given SAC of the authority that any of the users has over the given SAC.

As clearly shown in FIG. 1A, SACs 120, 122 and 124 do not include data elements such as files and file folders. Furthermore, user interface 102 does not provide visualization of access permissions of users included in SACs 120, 122 and 124 to data elements 132 such as files and file folders which reside on network 100.

Turning now to FIG. 1B, it is shown that the IT manager, utilizing SPBDVAUS user interface 102, ascertains that John has authority over legal SAC 120, HR SAC 122 and finance SAC 124, and immediately further utilizes user interface 102 to revoke John's authority over SACs 120, 122 and 124.

Turning now to FIG. 1C, the IT manager subsequently utilizes SPBDVAUS user interface 102 to obtain a user-wise report of the exercise of authority by John over SACs with respect to which John had authority. As seen in FIG. 1C, the IT manager ascertains that prior to termination of employment, John had granted access permissions to a legal folder to Susan, access permissions to a HR folder to Jerry and access permissions to a finance folder to Tim. The IT manager can then assess whether access permissions granted by John should be revoked.

As further shown in FIG. 1C, the IT manager utilizes SPBDVAUS user interface 102 to obtain a SAC-wise report of the exercise of authority over the legal SAC by the users having authority over the legal SAC. As seen in FIG. 1C, the IT manager ascertains that John granted access permissions to a legal folder to Susan, that Mary granted access permissions to a legal folder to Ron, and that Jim granted access permissions to a legal folder to David.

Figure 2A:
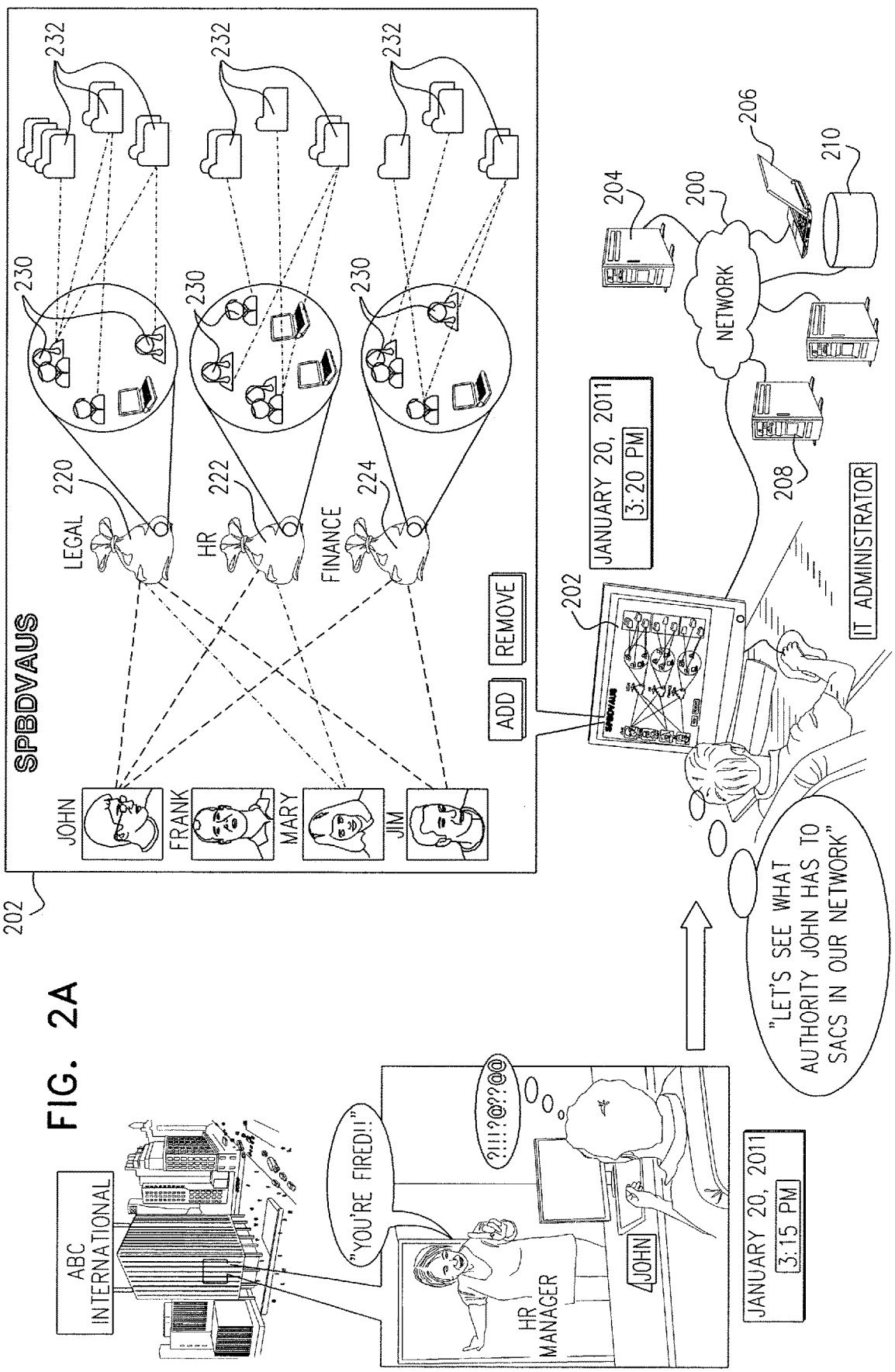
FIGS. 2A, 2B and 2C are simplified pictorial illustrations of the use of a system for providing bi-directional visualization of authority of users over SACs in an enterprise-wide network, constructed and operative in accordance with another preferred embodiment of the present invention.
Figure 2B:
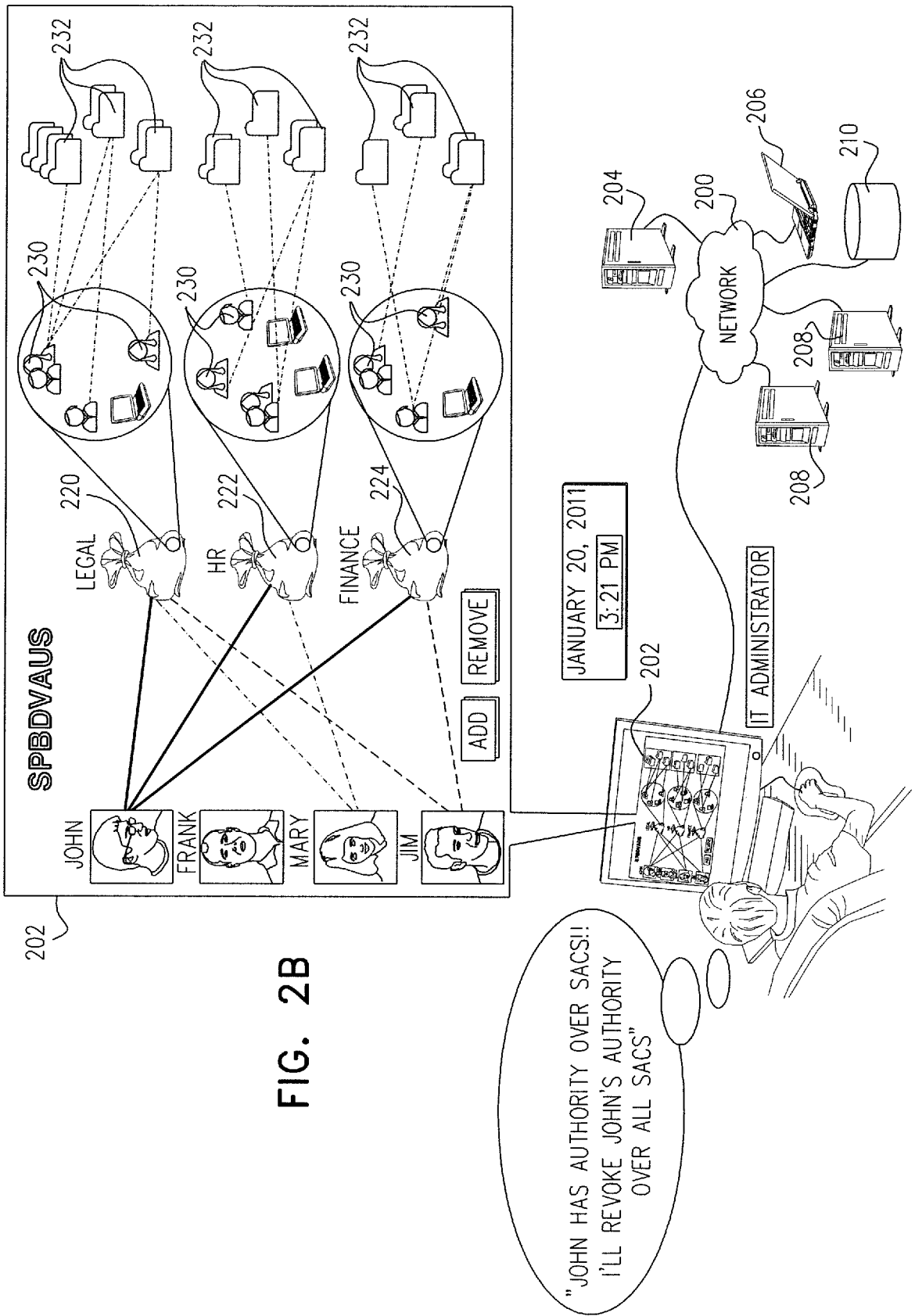
Figure 2C:
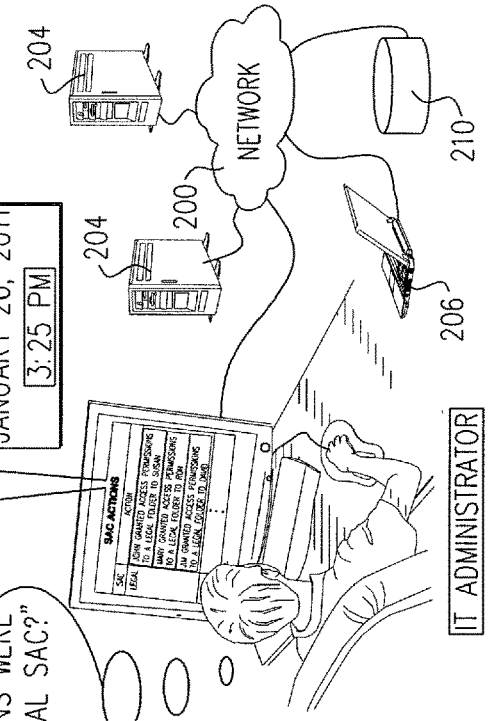
Figure 2C:
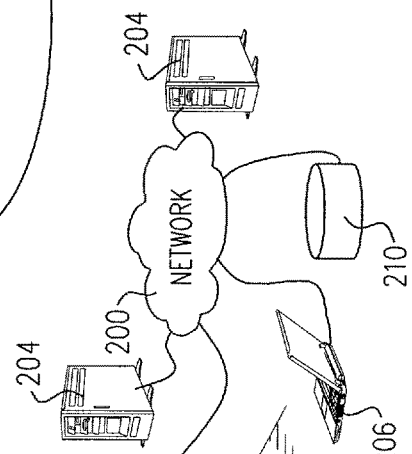
Figure 2C:

Reference is now made to FIGS. 2A, 2B and 2C, which are simplified pictorial illustrations of the use of a system for providing bi-directional visualization of authority of users over SACs in an enterprise-wide network, constructed and operative in accordance with another preferred embodiment of the present invention.

The system for providing bi-directional visualization of authority of users over SACs (SPBDVAUS) of FIGS. 2A-2C is preferably suitable for operating in an enterprise computer environment which includes an enterprise level directory services management system which enables management of a plurality of SACs, and preferably includes functionality for providing user-wise visualization of the authority of a given user over at least one SAC in respect of which the user has authority and functionality for providing SAC-wise visualization for a given SAC of the authority of at least one user over the given SAC.

The SPBDVAUS also preferably includes functionality for providing user-wise monitoring and reporting of the exercise of authority by a given user over at least one SAC with respect to which the user has authority and functionality for providing SAC-wise monitoring and reporting of the exercise of authority over a given SAC by at least one user having authority over said given SAC.

As shown in FIG. 2A, at a particular time, such as on Jan. 20, 2011 at 3:15 PM, an HR manager of a company notifies John, an employee of the company, that his employment with the company is terminated. Shortly thereafter, such as at 3:20 PM, the IT manager of the enterprise network 200 of the company accesses a SPBDVAUS user interface 202 to obtain a user-wise visualization of the authority that users of network 200 have over SACs in network 200. The SPBDVAUS preferably resides on a server 204 which is preferably connected to network 200. Network 200 preferably also includes a plurality of disparate computers 206, servers 208 and storage devices 210.

As further shown in FIG. 2A, SPBDVAUS user interface 202 provides, for each of the users of network 220, user-wise visualization of the authority of a given user has over any of legal SAC 220, HR SAC 222 and finance SAC 224 of network 200. SPBDVAUS user interface 202 also provides, for each of SACs 220, 222 and 224, SAC-wise visualization for a given SAC of the authority that any of the users has over the given SAC.

As clearly shown in FIG. 2A, SACs 220, 222 and 224 do not include data elements such as files and file folders. However, user interface 202 provides visualization of access permissions of users included in SACs 220, 222 and 224 to data elements 232 such as files and file folders which reside on network 200.

Turning now to FIG. 2B, it is shown that the IT manager, utilizing SPBDVAUS user interface 202, ascertains that John has authority over legal SAC 220, HR SAC 222 and finance SAC 224, and immediately further utilizes user interface 202 to revoke John's authority over SACs 220, 222 and 224.

Turning now to FIG. 2C, the IT manager subsequently utilizes SPBDVAUS user interface 202 to obtain a user-wise report of the exercise of authority by John over SACs with respect to which John had authority. As seen in FIG. 2C, the IT manager ascertains that prior to termination of employment, John had granted access permissions to a legal folder to Susan, access permissions to a HR folder to Jerry and access permissions to a finance folder to Tim. The IT manager can then assess whether access permissions granted by John should be revoked.

As further shown in FIG. 2C, the IT manager utilizes SPBDVAUS user interface 202 to obtain a SAC-wise report of the exercise of authority over the legal SAC by the users having authority over the legal SAC. As seen in FIG. 2C, the IT manager ascertains that John granted access permissions to a legal folder to Susan, that Mary granted access permissions to a legal folder to Ron, and that Jim granted access permissions to a legal folder to David.

Figure 3A:
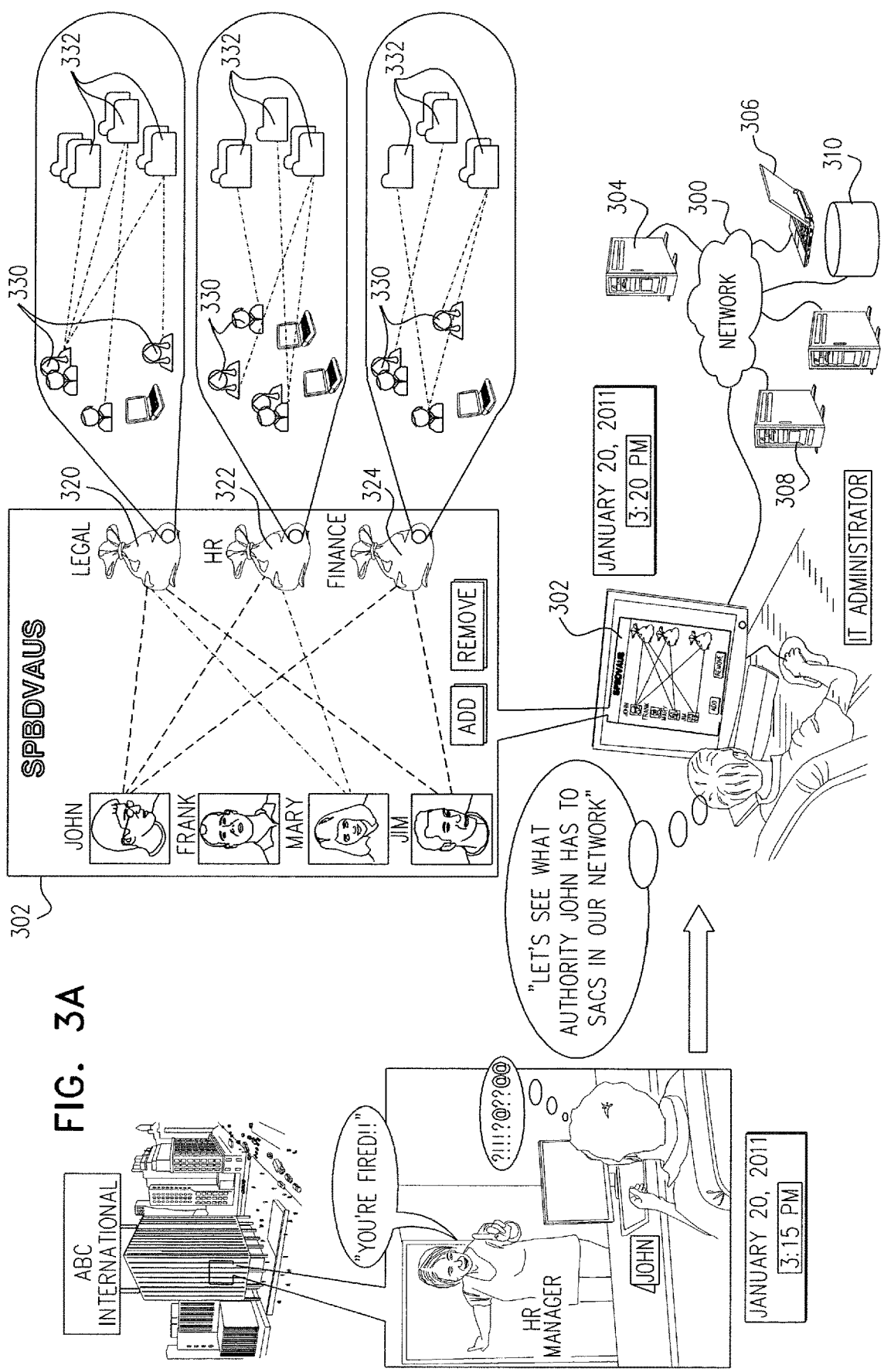
FIGS. 3A, 3B and 3C are simplified pictorial illustrations of the use of a system for providing bi-directional visualization of authority of users over SACs in an enterprise-wide network, constructed and operative in accordance with yet another preferred embodiment of the present invention.
Figure 3B:
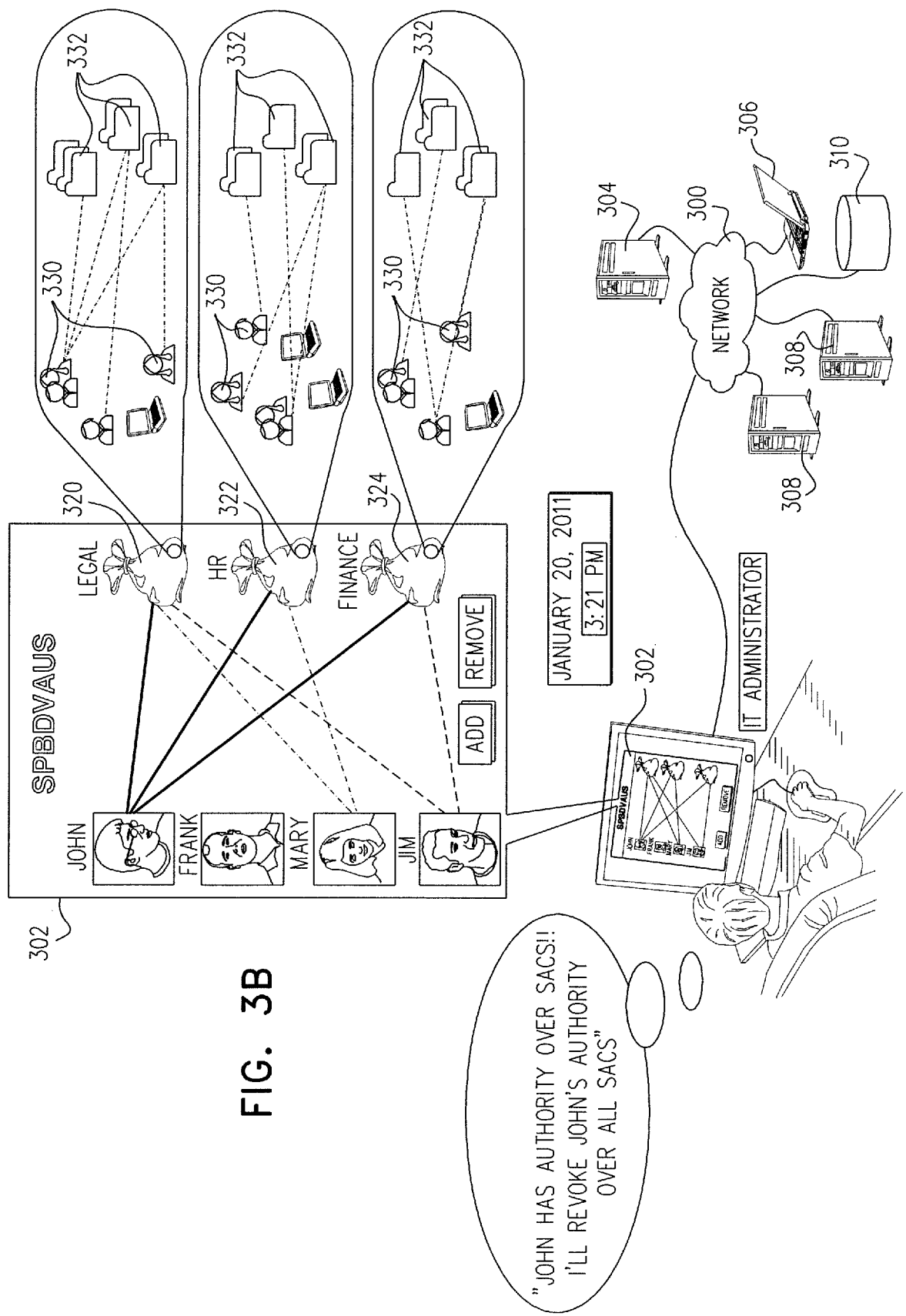
Figure 3C:
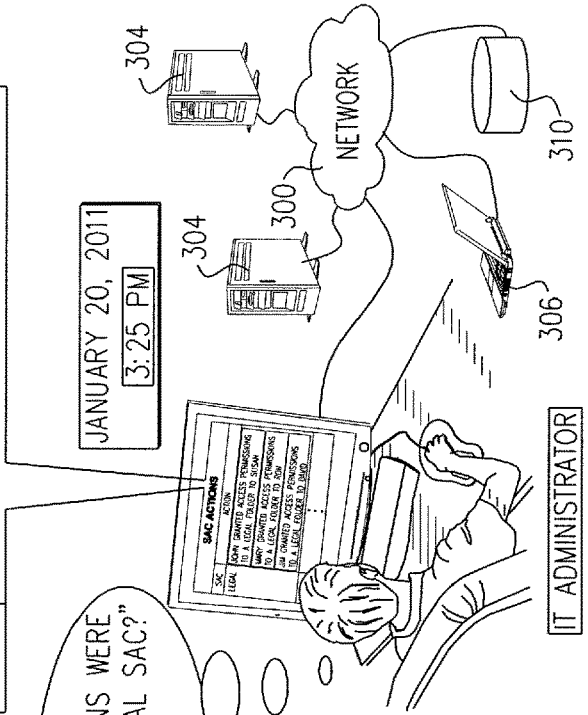

Reference is now made to FIGS. 3A, 3B and 3C, which are simplified pictorial illustrations of the use of a system for providing bi-directional visualization of authority of users over SACs in an enterprise-wide network, constructed and operative in accordance with yet another preferred embodiment of the present invention.

The system for providing bi-directional visualization of authority of users over SACs (SPBDVAUS) of FIGS. 3A-3C is preferably suitable for operating in an enterprise computer environment which includes an enterprise level directory services management system which enables management of a plurality of SACs, and preferably includes functionality for providing user-wise visualization of the authority of a given user over at least one SAC in respect of which the user has authority and functionality for providing SAC-wise visualization for a given SAC of the authority of at least one user over the given SAC.

The SPBDVAUS also preferably includes functionality for providing user-wise monitoring and reporting of the exercise of authority by a given user over at least one SAC with respect to which the user has authority and functionality for providing SAC-wise monitoring and reporting of the exercise of authority over a given SAC by at least one user having authority over said given SAC.

As shown in FIG. 3A, at a particular time, such as on Jan. 20, 2011 at 3:15 PM, an HR manager of a company notifies John, an employee of the company, that his employment with the company is terminated. Shortly thereafter, such as at 3:20 PM, the IT manager of the enterprise network 300 of the company accesses a SPBDVAUS user interface 302 to obtain a user-wise visualization of the authority that users of network 300 have over SACs in network 300. The SPBDVAUS preferably resides on a server 304 which is preferably connected to network 300. Network 300 preferably also includes a plurality of disparate computers 306, servers 308 and storage devices 310.

As further shown in FIG. 3A, SPBDVAUS user interface 302 provides, for each of the users of network 320, user-wise visualization of the authority of a given user has over any of legal SAC 320, HR SAC 322 and finance SAC 324 of network 300. SPBDVAUS user interface 302 also provides, for each of SACs 320, 322 and 324, SAC-wise visualization for a given SAC of the authority that any of the users has over the given SAC.

As clearly shown in FIG. 3A, SACs 320, 322 and 324 include data elements 332 such as files and file folders. However, user interface 302 does not provide visualization of access permissions of users included in SACs 320, 322 and 324 to data elements 332 such as files and file folders which reside on network 300.

Turning now to FIG. 3B, it is shown that the IT manager, utilizing SPBDVAUS user interface 302, ascertains that John has authority over legal SAC 320, HR SAC 322 and finance SAC 324, and immediately further utilizes user interface 302 to revoke John's authority over SACs 320, 322 and 324.

Turning now to FIG. 3C, the IT manager subsequently utilizes SPBDVAUS user interface 302 to obtain a user-wise report of the exercise of authority by John over SACs with respect to which John had authority. As seen in FIG. 3C, the IT manager ascertains that prior to termination of employment, John had granted access permissions to a legal folder to Susan, access permissions to a HR folder to Jerry and access permissions to a finance folder to Tim. The IT manager can then assess whether access permissions granted by John should be revoked.

As further shown in FIG. 3C, the IT manager utilizes SPBDVAUS user interface 302 to obtain a SAC-wise report of the exercise of authority over the legal SAC by the users having authority over the legal SAC. As seen in FIG. 3C, the IT manager ascertains that John granted access permissions to a legal folder to Susan, that Mary granted access permissions to a legal folder to Ron, and that Jim granted access permissions to a legal folder to David.

Figure 4A:
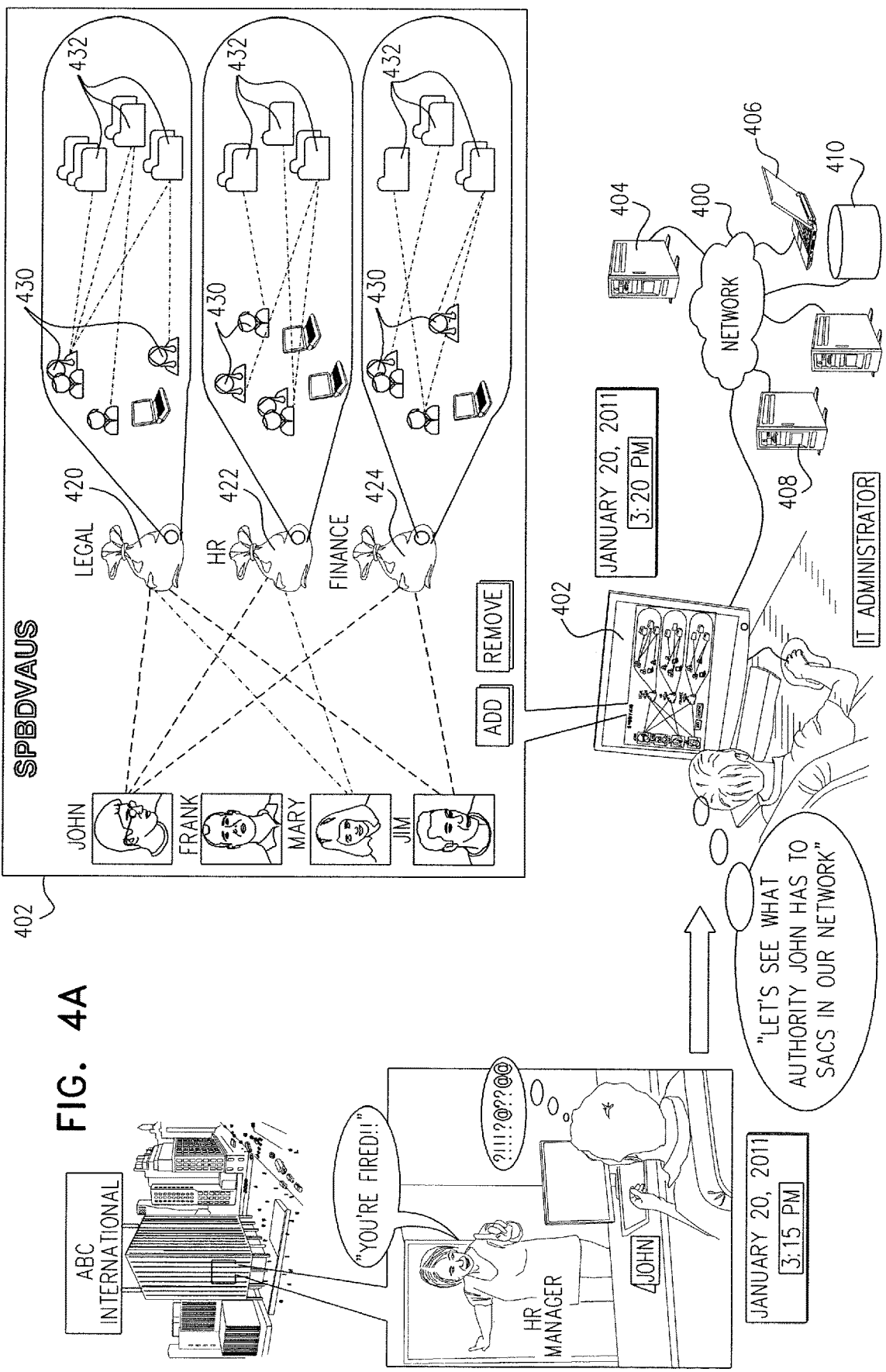
Figure 4B:
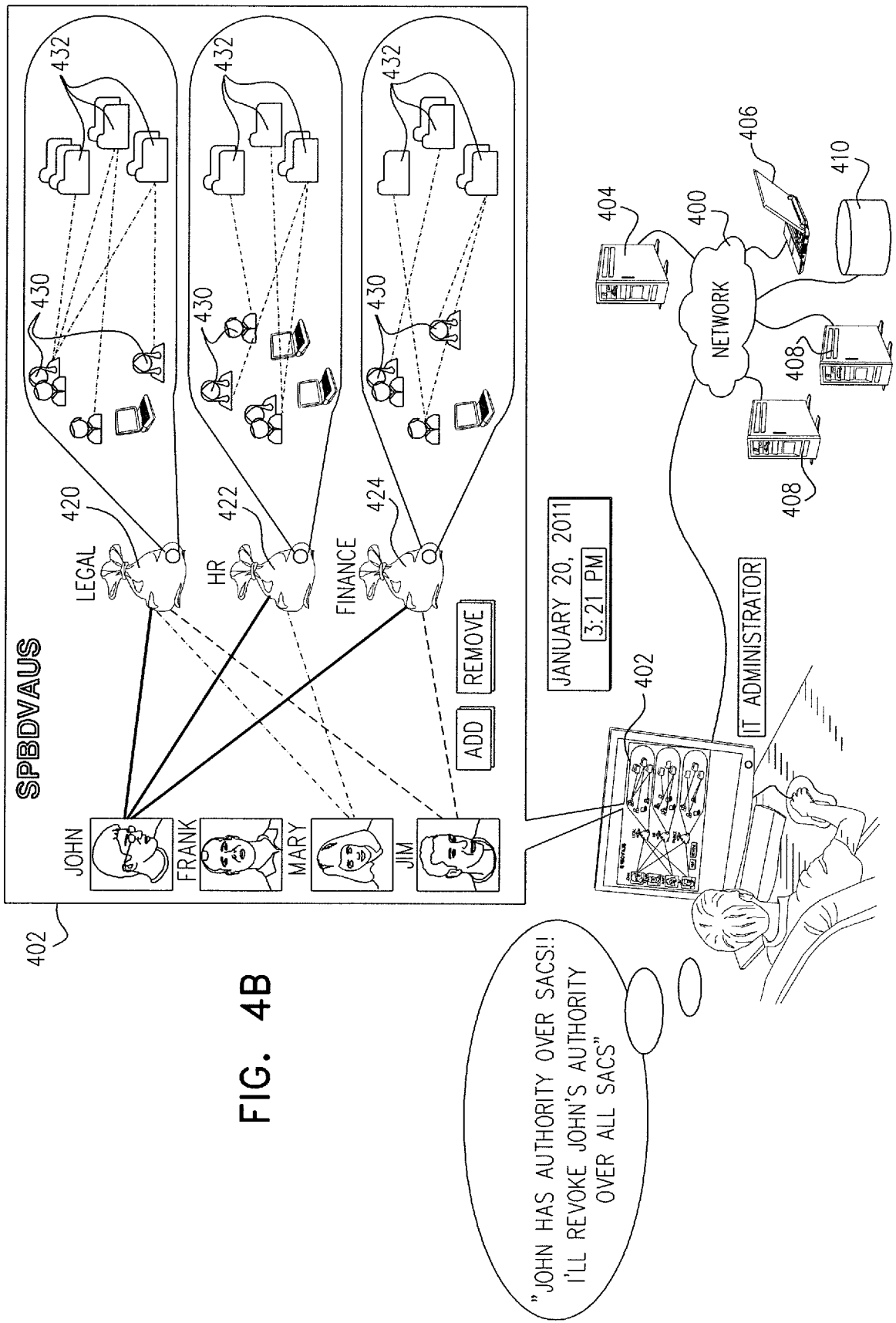
Figure 4C:
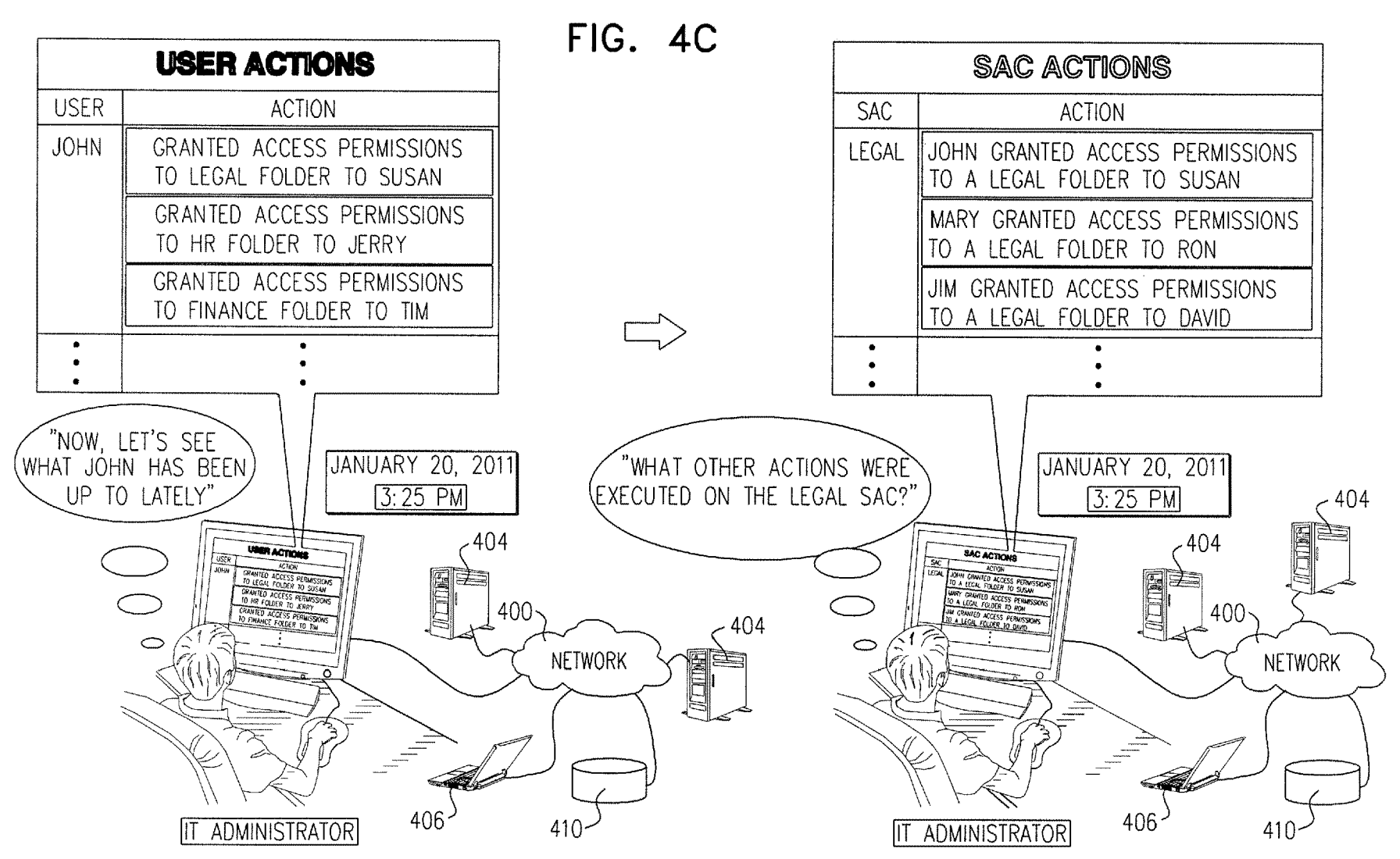

Reference is now made to FIGS. 4A, 4B and 4C, which are simplified pictorial illustrations of the use of a system for providing bi-directional visualization of authority of users over SACs in an enterprise-wide network, constructed and operative in accordance with yet another preferred embodiment of the present invention.

The system for providing bi-directional visualization of authority of users over SACs (SPBDVAUS) of FIGS. 4A-4C is preferably suitable for operating in an enterprise computer environment which includes an enterprise level directory services management system which enables management of a plurality of SACs, and preferably includes functionality for providing user-wise visualization of the authority of a given user over at least one SAC in respect of which the user has authority and functionality for providing SAC-wise visualization for a given SAC of the authority of at least one user over the given SAC.

The SPBDVAUS also preferably includes functionality for providing user-wise monitoring and reporting of the exercise of authority by a given user over at least one SAC with respect to which the user has authority and functionality for providing SAC-wise monitoring and reporting of the exercise of authority over a given SAC by at least one user having authority over said given SAC.

As shown in FIG. 4A, at a particular time, such as on Jan. 20, 2011 at 3:15 PM, an HR manager of a company notifies John, an employee of the company, that his employment with the company is terminated. Shortly thereafter, such as at 3:20 PM, the IT manager of the enterprise network 400 of the company accesses a SPBDVAUS user interface 402 to obtain a user-wise visualization of the authority that users of network 400 have over SACs in network 400. The SPBDVAUS preferably resides on a server 404 which is preferably connected to network 400. Network 400 preferably also includes a plurality of disparate computers 406, servers 408 and storage devices 410.

As further shown in FIG. 4A, SPBDVAUS user interface 402 provides, for each of the users of network 420, user-wise visualization of the authority of a given user has over any of legal SAC 420, HR SAC 422 and finance SAC 424 of network 400. SPBDVAUS user interface 402 also provides, for each of SACs 420, 422 and 424, SAC-wise visualization for a given SAC of the authority that any of the users has over the given SAC.

As clearly shown in FIG. 4A, SACs 420, 422 and 424 include data elements 432 such as files and file folders. Furthermore, user interface 402 provides visualization of access permissions of users included in SACs 420, 422 and 424 to data elements 432 such as files and file folders which reside on network 400.

Turning now to FIG. 4B, it is shown that the IT manager, utilizing SPBDVAUS user interface 402, ascertains that John has authority over legal SAC 420, HR SAC 422 and finance SAC 424, and immediately further utilizes user interface 402 to revoke John's authority over SACs 420, 422 and 424.

Turning now to FIG. 4C, the IT manager subsequently utilizes SPBDVAUS user interface 402 to obtain a user-wise report of the exercise of authority by John over SACs with respect to which John had authority. As seen in FIG. 4C, the IT manager ascertains that prior to termination of employment, John had granted access permissions to a legal folder to Susan, access permissions to a HR folder to Jerry and access permissions to a finance folder to Tim. The IT manager can then assess whether access permissions granted by John should be revoked.

As further shown in FIG. 4C, the IT manager utilizes SPBDVAUS user interface 402 to obtain a SAC-wise report of the exercise of authority over the legal SAC by the users having authority over the legal SAC. As seen in FIG. 4C, the IT manager ascertains that John granted access permissions to a legal folder to Susan, that Mary granted access permissions to a legal folder to Ron, and that Jim granted access permissions to a legal folder to David.

Figure 5:
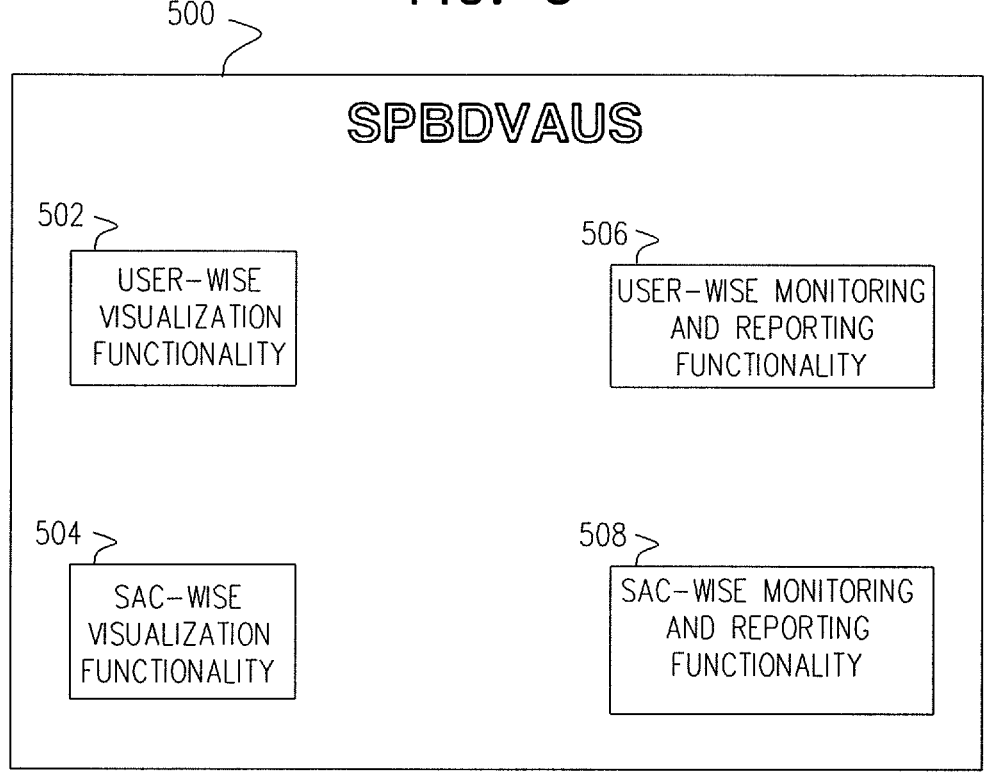
FIG. 5 is a simplified block diagram illustration of the system of FIGS. 1A-4C.

Reference is now made to FIG. 5, which is a simplified block diagram illustration of the system of FIGS. 1A-4C. As shown in FIG. 5, the SPBDVAUS 500 preferably includes user-wise visualization functionality 502 for providing user-wise visualization of the authority of a given user over at least one SAC in respect of which the user has authority and SAC-wise visualization functionality 504 for providing SAC-wise visualization for a given SAC of the authority of at least one user over the given SAC.

SPBDVAUS 500 also preferably includes user-wise monitoring and reporting functionality 506 for providing user-wise monitoring and reporting of the exercise of authority by a given user over at least one SAC with respect to which the user has authority, and SAC-wise monitoring and reporting functionality 508 for providing SAC-wise monitoring and reporting of the exercise of authority over a given SAC by at least one user having authority over said given SAC.

It will be appreciated by persons skilled in the art that the present invention is not limited by what has been particularly shown and described hereinabove. Rather, the invention also includes various combinations and subcombinations of the features described hereinabove as well as modifications and variations thereof, which would occur to persons skilled in the art upon reading the foregoing and which are not in the prior art.

The invention claimed is:

1. A system comprising a non-transitory, tangible computer-readable medium in which computer program instructions are stored, which instructions, when read by a computer, cause the computer to automatically provide bi-directional visualization of authority of users over SACs in an enterprise-wide network and to enable modification of said authority of said users over said SACs to provide improved systems and methodologies for access permissions management in enterprise computer network, said SACs comprising containers, each of said containers comprising network objects, said authority of a user over a SAC comprising an ability of said user to modify properties of said network objects, said system comprising:
 a user interface for displaying, in a single view, bi-directional visualization of authority of all users of said enterprise-wide network over all SACs in said enterprise-wide network, said users being users other than owners of said SACs, each of said network objects of each of said SACs comprising only at least one of at least one user and at least one user group, said bi-directional visualization in said single view comprising:
  a first uni-directional visualization comprising, for a given user, user-wise visualization of the authority of said given user over at least one SAC in respect of which said given user has authority, said given user being a user other than an owner of said at least one SAC; and
  a second uni-directional visualization comprising SAC-wise visualization for a given SAC of the authority of at least one user over said given SAC, said at least one user being a user other than an owner of said given SAC; and
 a user interface for enabling a human viewer of said bi-directional visualization to modify said authority of said given user over said SACs.

2. A system according to claim 1 and wherein:
said SACs do not include data elements; and
said user-wise visualization does not provide visualization of authority of a given user over data elements.

3. A system according to claim 1 and wherein:
said SACs do not include data elements; and
said user-wise visualization also provides visualization of authority of a given user over data elements.

4. A system according to claim 1 and also comprising:
a user interface for providing user-wise monitoring and reporting of the exercise of authority by a given user over at least one SAC with respect to which the user has authority; and
a user interface for providing SAC-wise monitoring and reporting of the exercise of authority over a given SAC by at least one user having authority over said given SAC.

5. A system according to claim 1 and wherein said user interface enables said human viewer to revoke said authority of said user over said SACs.

6. A method for providing bi-directional visualization of authority of users over SACs in an enterprise-wide network and enabling modification of said authority of said users over said SACs to provide improved systems and methodologies for access permissions management in enterprise computer network, said SACs comprising containers, each of said containers comprising network objects, said authority of a user over a SAC comprising an ability of said user to modify properties of said network objects, said method comprising:
 displaying, in a single view, a first uni-directional visualization comprising, for each given user of said enterprise-wide network, visualization of the authority of said given user over each SAC of said enterprise-wide network in respect of which said given user has authority, said given user being a user other than an owner of said at least one SAC, and a second uni-directional visualization comprising SAC-wise visualization for a each given SAC of the authority of each user of said enterprise-wide network over each said given SAC, said at least one user being a user other than an owner of said given SAC, each of said network objects of each of said SACs comprising only at least one of at least one user and at least one user group; and
 enabling a human viewer of said bi-directional visualization to modify said authority of said given user over said SACs.

7. A method according to claim 6 and wherein:
said SACs do not include data elements; and
said providing user-wise visualization does not include providing visualization of authority of a given user over data elements.

8. A method according to claim 6 and wherein:
said SACs do not include data elements; and
said providing user-wise visualization also includes providing visualization of authority of a given user over data elements.

9. A method according to claim 6 and also comprising:
providing user-wise monitoring and reporting of the exercise of authority by a given user over at least one SAC with respect to which the user has authority; and
providing SAC-wise monitoring and reporting of the exercise of authority over a given SAC by at least one user having authority over said given SAC.

10. A method according to claim 6 and wherein said enabling said human viewer comprises enabling said human viewer to revoke said authority of said user over said SACs.

* * * * *